March 29, 1966   R. N. ROWE   3,243,663
CIRCUIT BREAKER PANEL BOARD
Filed March 26, 1964   2 Sheets-Sheet 1
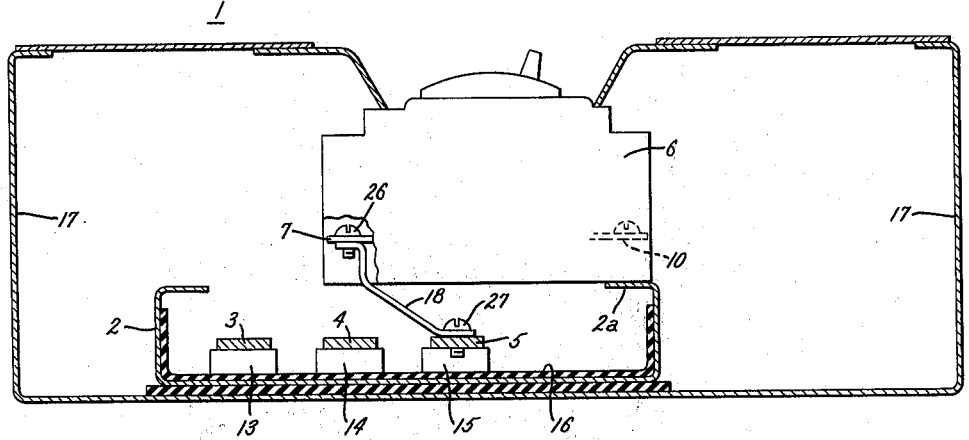
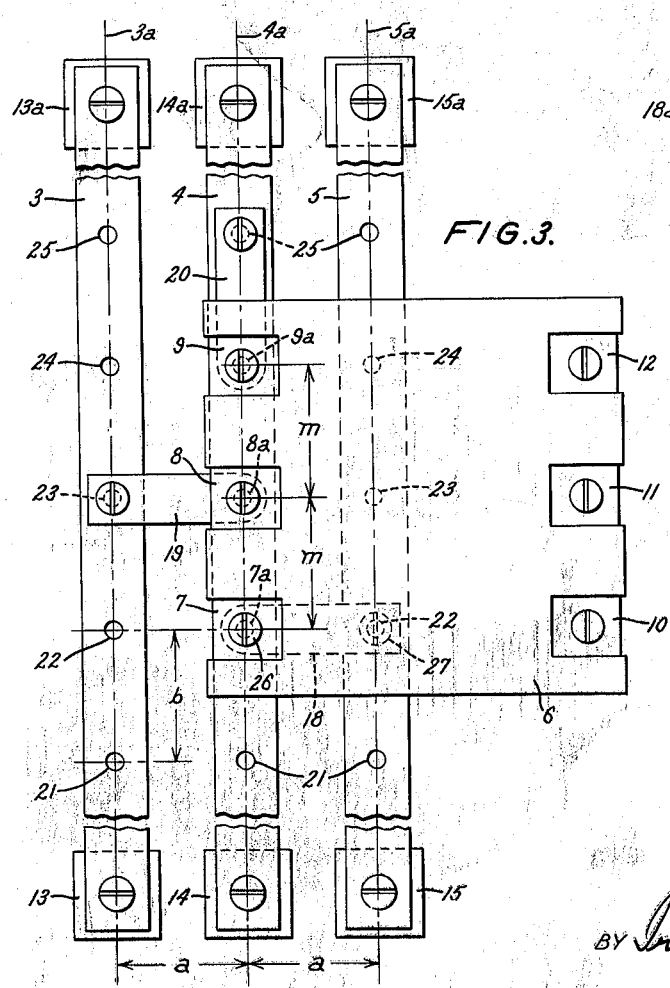
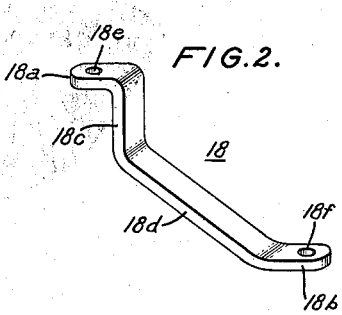
INVENTOR:
RAYMOND N. ROWE,
BY Irving A. Marshman
ATTORNEY

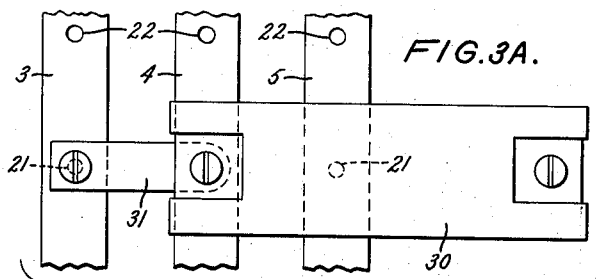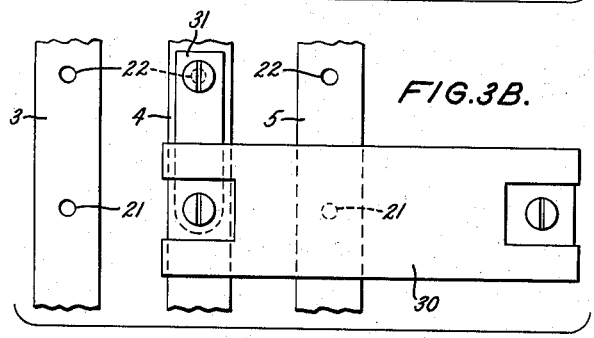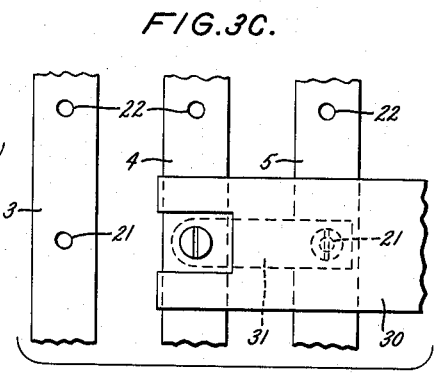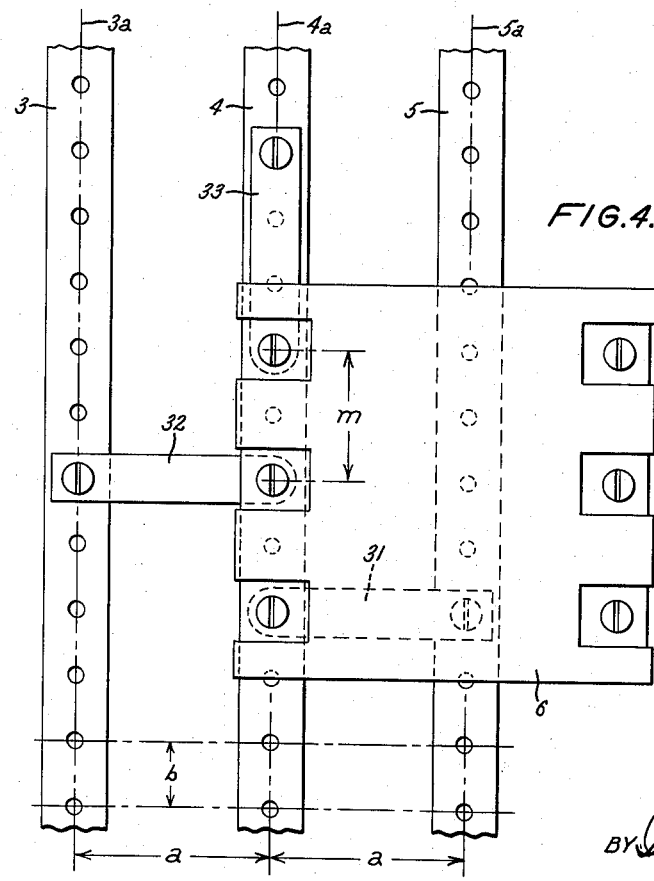

United States Patent Office 3,243,663
Patented Mar. 29, 1966

3,243,663
CIRCUIT BREAKER PANEL BOARD
Raymond N. Rowe, Wakefield, R.I., assignor to General Electric Company, a corporation of New York
Filed Mar. 26, 1964, Ser. No. 354,879
6 Claims. (Cl. 317—119)

This invention relates to panel boards and has particular relation to panel boards of the type wherein a plurality of circuit interrupter units are connected to a plurality of bus bars for controlling the distribution of power to branch circuits, and it has for an object the provision of a panelboard assembly in which economies are achieved by standardization of parts that is made possible by a novel relationship of panelboard elements.

In many panelboard assemblies the bus bars usually extend the full length of the panel. In existing installations, connections from the busbars to the line terminals of the circuit breakers or switches assembled on the panelboard were frequently made by means of electroconductive connector straps which were bolted or screwed to the bus conductors and to the line terminals of the circuit breakers or switches assembled on the panelboard. These connector straps usually present a problem because each of them may be different in dimension and ampere capacity from each of the others. This results in high manufacturing costs because manufacturers are required to stock a number of each of the different connector straps and to provide an individual shop tool for the fabrication of each of the different straps. Accordingly a further object of the invention is the provision of a panelboard assembly in which the connections from all of the line terminals of each of the three pole devices mounted thereon to corresponding busbars may be made by identical electroconductive connector straps.

In existing installations complications arise in the case of panelboards that are shipped with open spaces left to accommodate future circuits. In ordering connector straps for a new circuit breaker for installation in one of the open spaces of the panelboard, the user must exercise care in specifying the connector strap requirements and frequently mistakes are made. Accordingly, a further and more specific object of the invention is the provision of a panelboad assembly which greatly simplifies the problem of specifying connector strap requirements for circuit breakers being added to existing panelboard installations.

Briefly described, the invention comprises a panelboard for mounting electrical devices such as three pole circuit breakers the line terminals of which are arranged in a straight line and equally spaced apart. Three bus bars are mounted on the panelboard equally spaced apart and in parallel relationship in a common plane. A plurality of fastening holes are provided in each bus bar equally spaced apart along its longitudinal centerline. Means are provided for mounting electrical devices on the panelboard in spaced relationship to the common plane of the bus bars with all line terminals of the electrical devices in a straight line parallel to the longitudinal centerline of the intermediate bus bar and in a plane perpendicular to the common plane of the bus bars. The spacing of the bus bars and the spacing of the fastening holes therein are correlated with the spacing of the line terminals of the electrical devices to provide for connecting the line terminals to the bus bars at fastening hole locations by means of electroconductive connector straps of identical construction.

For a better and more complete understanding of the invention reference should now be had to the following specification and to the accompanying drawings of which:

FIG. 1 is a diagrammatic sketch of a cross section of a panelboard embodying the invention, FIG. 2 is a sketch in perspective of an electroconductive connector strap which constitutes an element of the invention, FIG. 3 is a fragmentary view of an embodiment of the invention illustrating important relationships of elements, FIGS. 3A, 3B and 3C are fragmentary sketches useful in explaining certain advantages of the invention and FIG. 4 is a fragmentary view of a modification illustrating important relationships of elements.

Referring now to the drawings and particularly to FIGURES 1, 2 and 3, there is shown a panelboard, designated generally by the reference character 1, embodying the invention. In general, panelboard 1 includes a substantially channel shaped mounting plate or tray 2 which supports a plurality of bus bars 3, 4 and 5 electrically connected to one or more electrical devices such as the circuit interrupter 6. This device which may be a molded case circuit breaker, is supported on the inwardly turned flange 2A of the mounting plate 2.

The case of the circuit breaker 6 is of generally rectangular configuration as viewed from above, from in front or from the side. It is illustrated as a three pole circuit breaker and is provided with three line terminals 7, 8 and 9 and with load terminals 10, 11 and 12. The line terminals 7, 8 and 9 are arranged in a straight row near one end of the breaker. They are provided with fastening holes 7a, 8a and 9a respectively. These holes are equally spaced apart; i.e., the distances between the center of the hole 8a from the centers of the hole 7a and 9a are equal. The distance between the centers of the fastening holes of one line terminal and the next is known as the modulus of the breaker. Thus in FIG. 3 the modulus of the breaker 6 is graphically represented in FIG. 3 by the distance $m$.

The bus bars 3, 4 and 5 may constitute part of a 3-phase 3-wire alternating current supply system for supplying electrical power to a plurality of branch circuits (not shown) which are controlled by the breaker 6 and other similar breakers (not shown) which are connected to the bus bars 3, 4 and 5. As shown in FIG. 1, the bus bars 3, 4 and 5 are mounted on the mounting plate 2 by means of laterally spaced insulating supports 13, 14 and 15, respectively, at one end of the mounting plate and by insulating supports 13a, 14a, and 15a respectively at the other end. An insulating sheet 16 rests upon the upper surface of the mounting plate 2.

The bus bars 3, 4 and 5 are mounted in longitudinal parallel relationship in a generally common plane and extend from end to end of the mounting plate. As shown in FIG. 1 the mounting plate 2 is mounted on the rear wall of the panelboard enclosure 17 and extends from end to end of such enclosure. As illustrated in FIGS. 1, 3 and 4, the bus bars 3, 4 and 5 are equally spaced apart, i.e., the distance between the centerlines 3a and 4a of bus bars 3 and 4 is equal to the distance between the centerlines 4a and 5a of bus bars 4 and 5. This spacing between longitudinal centerlines is graphically represented in FIGS. 3 and 4 by the distance $a$.

The flange 2a of the mounting plate 2 serves as a shelf for mounting one end of the circuit breaker 6 and all other circuit breakers or devices (not shown) that are included within the panelboard enclosure. For the purpose of connecting the line terminals 7, 8 and 9 of circuit breaker 6 to the bus bars 3, 4 and 5, connector straps 18, 19 and 20 are provided. These connector straps are of the bolt on type and may be made of any good electroconductive material such as copper.

The construction of one of these connector straps, e.g., the strap 18, is illustrated in FIG. 2. It has two flat end terminal portions 18a and 18b which occupy parallel planes, a leg portion 18c extending downwardly and perpendicularly from the inner end of the terminal portion 18a and a second leg portion 18d joining the lower end of leg 18c and the inner end of terminal portion 18b. To provide for bolting the connector strap 18 to a terminal of the circuit breaker 6 and to a corresponding one of the bus bars, the terminal portion 18a is provided with a fastening hole 18e and terminal portion 18b is provided with a fastening hole 18f.

For the purpose of receiving the threaded ends of the fastening bolts each of the bus bars 3, 4 and 5 is provided with a plurality of tapped fastening holes equally spaced apart along its longitudinal centerline. The portion of each of the bus bars illustrated in FIG. 3 is provided with tapped holes 21, 22, 23, 24 and 25. These holes are equally spaced apart along the longitudinal centerline of the bus bar, i.e., the distance between the center of each of these fastening holes and the centers of the adjacent fastening holes are equal. In FIGS. 3 and 4 the spacing distance between fastening holes is represented graphically by the distance $b$.

Thus to connect a line terminal, e.g., terminal 7 to one of the bus bars, e.g., bus bar 5, the flat portion 18a of connector strap 18 is bolted to line terminal 7 by means of bolt 26 through the fastening hole 7a in the terminal and fastening hole 18e in the strap and by means of bolt 27 through the fastening hole 18f in the strap and fastening hole 22 in bus bar 5. In a similar fashion line terminals 8 and 9 may be connected to bus bars 3 and 4 respectively by means of connector straps 19 and 20 respectively. In order that the connector straps 18, 19 and 20 which connect the three line terminals to corresponding bus bars may be of identical construction, the spacing between centerlines in the bus bars and the spacing between adjacent fastening holes in each bus bar are correlated with the module of the breaker.

In the arrangement illustrated in FIG. 3, the spacing of the bus bars 3, 4 and 5 is made equal to the modulus of the breaker 6. In other words the distance $a$ between the longitudinal centerlines of adjacent bus bars is made equal to the distance $m$ between the centers of the fastening holes in adjacent line terminals of the breaker. Also the spacing of the fastening holes in each bus bar is made equal to the modulus of the breaker, i.e., the distance $b$ between the centers of adjacent fastening holes is made equal to $m$. The bus bars are so mounted that the centers of corresponding fastening holes are points on straight cross lines that are perpendicular to the longitudinal centerlines of the bus bars. For example, in FIGS. 3 and 4 the centers of all corresponding fastening holes 21 in the bus bars 3, 4 and 5 occupy points on a straight line and this line is perpendicular to the longitudinal centerlines of the bus bars.

As shown in FIGS. 1 and 3, the circuit breaker 6 is mounted on the panelboard with the centerline of the row of line terminal fastening holes 7a, 8a and 9a parallel to the longitudinal centerline 4a of the intermediate bus bar 4 in a plane that is perpendicular to the general plane of the bus bars. Also, the center of each of the fastening holes 7a, 8a and 9a is aligned with the center of the corresponding fastening hole in the bus bar 4a. The line terminal 7 of the breaker is connected to bus bar 5 by means of connector strap 18 and bolts 26 and 27 as previously described. In a similar manner, line terminals 8 and 9 are connected to bus bars 3 and 4 by means of connector straps 19 and 20. Since the line terminals 7, 8 and 9 are equally distant from the general plane of the bus bars and further since the spacing between the centerlines of the bus bars and the spacing between the centers of the fastening holes in the bus bars are equal to the spacing between the line terminals of the circuit breaker, the connector straps 18, 19 and 20 may be of identical construction.

In each of FIGS. 3A, 3B and 3C a single pole circuit breaker 30 is mounted on the panelboard in generally the same manner as the circuit breaker 6 in FIGS. 1 and 3, with the center of the fastening hole of its line terminal aligned with the center of the fastening hole 21 of the intermediate bus bar 4. As thus mounted, the line terminal may be connected to any one of the bus bars 3, 4 or 5 by means of the same connector strap 31 which may be identical in construction with any one of the three identical connector straps 18, 19 and 20 of FIGS. 1, 2 and 3.

In FIGS. 3A, 3B and 3C the breaker 30 is connected alternatively to the bus bars 3, 4 and 5 by the same connector strap 31. Thus in the case of single pole breakers the invention simplifies the problem of ordering connector straps for branch circuits that are added after the original installation since it is not necessary to specify to which of the bus bars the breaker is to be connected. The invention is also useful in balancing the load on the bus bars in the panel. It is only necessary for the customer to order the required breaker or switch which would be equipped at the factory with a connector strap of proper ampere rating and the customer would be able to connect it to any selected one of the bus bars to provide the best load balance.

The modification illustrated in FIG. 4 is generally similar to the modification illustrated in FIGS. 1 and 3 and differs therefrom primarily in that the correlation between the breaker modulus, the spacing between the bus bars and the spacing between the fastening holes in the bus bars is modified to provide increased air space between the bus bars. The breaker 6 in FIG. 4 is the same as the breaker 6 in FIGS. 1 and 3 and has the same modulus $m$. The spacing between centerlines of adjacent bus bars is 1½ times the distance between centers of fastening holes of adjacent line terminals of breaker 6. In other words the distance $a$ is 1½ times $m$ as indicated graphically in FIG. 4. This spacing requires that the connector straps 31, 32 and 33 be longer than the connector straps 18, 19 and 20 in the modification illustrated in FIGS. 1 and 3. In addition, the bus bars 3, 4 and 5 are grilled and tapped every ½ module in order that fastening holes will be present in the intermediate bus bar 4 in correct register with fastening holes in the ends of the connector straps 33 that make contact with the intermediate bus. As illustrated in FIG. 4, the connector straps 31, 32 and 33 are of identical construction and thus the modification of FIG. 4 has the same advantages as the modification of FIGS. 1 and 3.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

What I claim as new and desire to secure by Letters Patent of the United States is:

1. In combination:
   (a) a panelboard enclosure for multipole and single pole electrical devices of rectangular configuration having one line terminal per pole, the line terminals of the multipole devices being arranged in a row and equally spaced therein,
   (b) three bus bars mounted within said enclosure in parallel spaced apart relationship in a common plane with the longitudinal center line of the intermediate bus bar spaced from the longitudinal center lines of the other two buses by equal amounts,
   (c) a plurality of fastening holes in each of said bus bars equally spaced along its longitudinal center line, the spacing between holes in all of said bars being equal,
   (d) means for mounting said electrical devices on said enclosure in spaced relationship to said common plane with all of said line terminals in a straight line parallel to said longitudinal center line of said intermediate bus bar and in a plane perpendicular to said common plane,
   (e) the spacing of said bus bars and the spacing of said fastening holes being correlated with the spacing of said line terminals to provide for connecting said terminals to corresponding bus bars by electroconductive straps of identical construction.

2. In combination:
(a) a panelboard enclosure for three pole and single pole electrical devices of rectangular configuration having one line terminal per pole, the line terminals of the three pole devices being arranged in a row and equally spaced apart therein,
(b) a mounting plate within said enclosure and secured thereto,
(c) three bus bars mounted on said mounting plate in parallel spaced apart relationship in a common plane with the longitudinal center line of the intermediate bus bar spaced from the longitudinal center line of the other two bars by equal amounts,
(d) the spacing of said longitudinal center lines being equal to the spacing of the terminals of said three pole devices,
(e) each of said bus bars having on its longitudinal center line a plurality of equally spaced fastening holes,
(f) the spacing of said holes being equal to the spacing of the line terminals of said three pole devices,
(g) means mounting said electrical devices on said mounting plate in spaced relationship to said common plane and with all of said line terminals of said electrical devices in a straight line parallel to said longitudinal center line of said intermediate bus bar and in a plane perpendicular to said common plane,
(h) three electroconductive connector straps of identical construction, each extending from a different one of the terminals of said three pole device to a corresponding one of said fastening holes in a corresponding one of said bus bars and
(i) an electroconductive connector strap identical with said three connector straps extending from the line terminal of each of said single pole devices to a corresponding one of said fastening holes in a selected one of said bus bars.

3. In combination:
(a) a panelboard enclosure for three pole and single pole electrical devices of rectangular configuration having one line terminal per pole, the line terminals of the multipole devices being arranged in a row and equally spaced apart therein,
(b) a mounting plate within said enclosure and secured thereto,
(c) three bus bars mounted on said mounting plate in parallel spaced apart relationship in a common plane with the longitudinal center line of the intermediate bus bar spaced from the longitudinal center lines of the other two bars by equal amounts,
(d) the spacing of said longitudinal center lines being equal to one and one half times the spacing of said line terminals of said multipole devices,
(e) each of said bus bars having on its longitudinal center line a plurality of equally spaced apart threaded fastening holes,
(f) the spacing of said holes being one half the spacing of said line terminals of said multipole electrical devices,
(g) said bus bars being mounted with corresponding holes arranged in straight cross rows perpendicular to said longitudinal center lines,
(h) means mounting said electrical devices on said mounting plate in spaced relationship to said common plane and with all of said line terminals of said electrical devices in a straight line parallel to said longitudinal center line of said intermediate bus bar and in a plane perpendicular to said common plane,
(i) three electroconductive connector straps of identical construction, each extending from a corresponding one of the line terminals of one of said three pole electrical devices to a corresponding one of said fastening holes in a corresponding one of said bus bars, and
(j) an electroconductive connector strap, identical with said three connector straps extending from the line terminal of each of said single pole devices to a corresponding one of said fastening holes in a selected one of said bus bars.

4. In combination:
(a) a panelboard enclosure for single pole and equal modulus three pole electrical devices having one line terminal per pole, the line terminals of the three pole devices being arranged in a straight line equally spaced apart,
(b) three bus bars mounted within said enclosure in parallel spaced apart relationship in a common plane with the longitudinal center line of the intermediate bus bar spaced from the longitudinal center lines of the other two bus bars by equal amounts,
(c) a plurality of fastening holes in each of said bus bars equally spaced along its longitudinal center line, the spacing between holes in all of said bars being equal,
(d) means for mounting said electrical devices on said enclosure in spaced relationship to said common plane with all of said line terminals in a straight line parallel to said longitudinal center line of said intermediate bus bar and in a plane perpendicular to said common plane,
(e) the spacing of said bus bars and the spacing of said fastening holes being correlated with the spacing of the line terminals of said three pole devices to provide for connecting all of the terminals of each of said three pole devices to fastening holes in corresponding bus bars by electroconductive straps of identical construction.

5. In combination:
(a) a panelboard enclosure for single pole and equal modulus three pole electrical devices having one line terminal per pole, the line terminals of the three pole devices being equally spaced apart in a straight line,
(b) a mounting plate within said enclosure and secured thereto,
(c) three bus bars mounted on said mounting plate in parallel spaced apart relationship in a common plane with the longitudinal center line of the intermediate bus bar spaced from the longitudinal center lines of the other two bars by equal amounts,
(d) each of said bus bars having on its longitudinal center line, a plurality of equally spaced fastening holes,
(e) means for mounting said electrical devices on said mounting plate in spaced relationship to said common plane and with all of said line terminals in a straight line parallel to said longitudinal center line of said intermediate bus bar and in a plane perpendicular to said common plane, and
(f) the spacing of said longitudinal center lines of said bus bars and the spacing of said holes being equal to the spacing of the line terminals of said three pole devices to provide for connecting all three of the terminals of each of said three pole devices to fastening holes in corresponding ones of said bus bars by electroconductive straps of identical construction.

6. In combination:
(a) a panelboard enclosure for single pole and equal modulus three pole electrical devices having one line terminal per pole, the line terminals of the three pole devices being equally spaced apart in a straight line,
(b) a mounting plate within said enclosure and secured thereto,
(c) three bus bars mounted on said mounting plate in parallel spaced apart relationship in a common plane with the longitudinal center line of the intermediate bus bar spaced from the longitudinal center line of the other two bars by equal amounts, (d) each of said bus bars having on its longitudinal center line a plurality of equally spaced apart fastening holes, (e) means mounting said electrical devices on said mounting plate in spaced relationship to said common plane and with all of said line terminals of said electrical devices in a straight line parallel to said longitudinal center line of said intermediate bus bar and in a plane perpendicular to said common plane, (f) said bus bars being mounted with corresponding holes arranged in straight cross rows perpendicular to said longitudinal center lines, (g) the spacing of said longitudinal center lines being equal to one and one half times the spacing of said line terminals of said three pole devices and the spacing of said holes being one half the spacing of said line terminals of said three pole devices thereby to provide for connecting all three of the terminals of each of said three pole devices to fastening holes in corresponding ones of said bus bars by electroconductive straps of identical construction.

No references cited.

KATHLEEN H. CLAFFY, *Primary Examiner.*

ROBERT S. MACON, *Examiner.*